Figure 1:
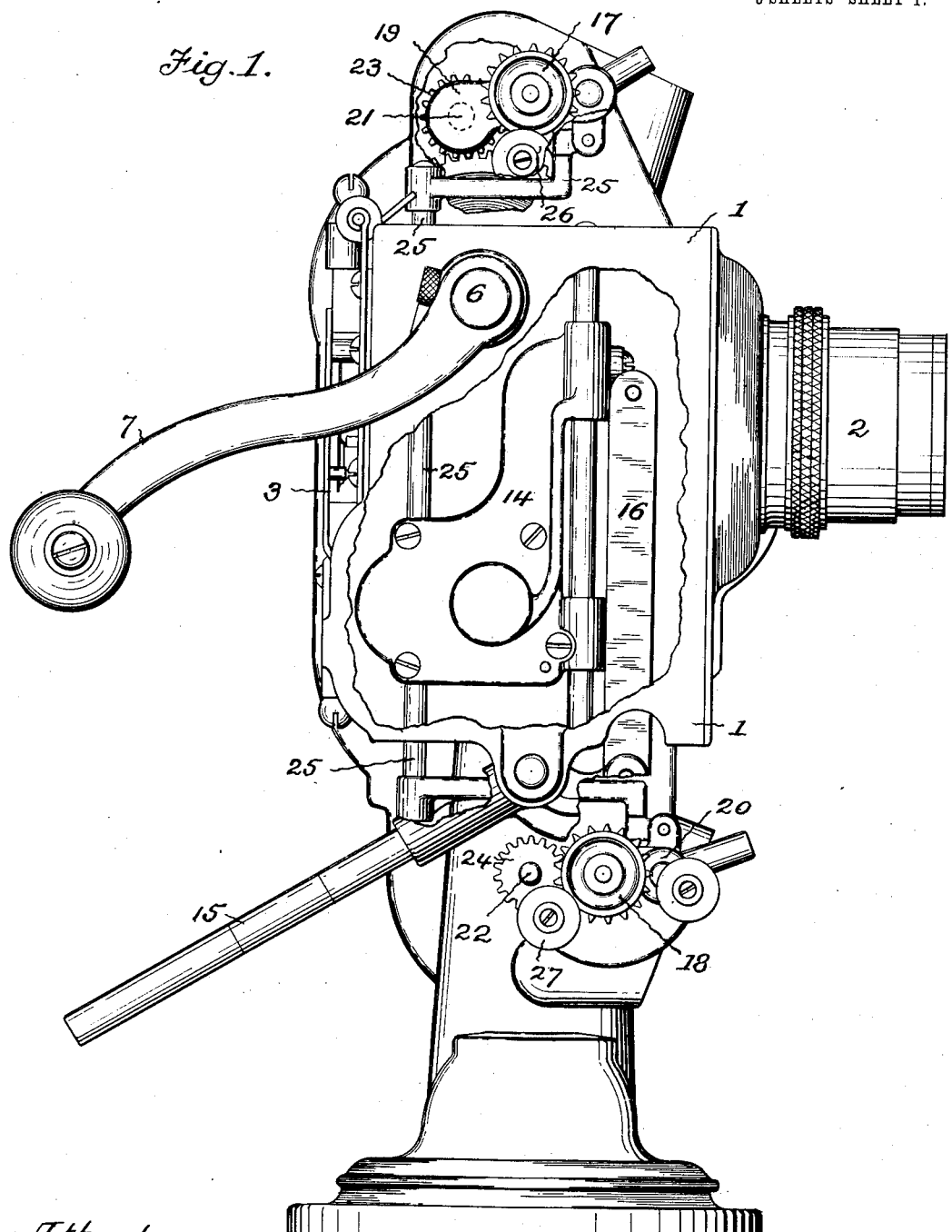

A. C. ROEBUCK.
KINETOSCOPE.
APPLICATION FILED NOV. 9, 1908.

927,875.

Patented July 13, 1909.
3 SHEETS—SHEET 3.

Attest:
Henry Mow.
M. H. Holmes.

Inventor:
Alvah C. Roebuck,
by Robert Burns.
Attorney.

UNITED STATES PATENT OFFICE.

ALVAH C. ROEBUCK, OF CHICAGO, ILLINOIS.

KINETOSCOPE.

No. 927,875.  Specification of Letters Patent.  Patented July 13, 1909.

Application filed November 9, 1908. Serial No. 461,709.

*To all whom it may concern:*

Be it known that I, ALVAH C. ROEBUCK, a citizen of the United States of America, and a resident of Chicago, in the county of Cook and State of Illinois, have invented certain new and useful Improvements in Kinetoscopes, of which the following is a specification.

This invention relates to that class of kinetoscopes in which a transparent film carrying a series of pictures receives an intermittent progressive movement through the apparatus to produce upon a suitable screen the appearance of objects in motion, and more particularly to the type of apparatus which constitutes the subject matter of my prior application for Letters Patent, Serial Number 425,094, filed April 4, 1908. In such mechanism the intermittent sprocket drum by which intermittent motion is imparted to the film is mounted on a vertically shiftable carriage, the object being to frame the picture, or in other words, shift the film to bring the margins thereof in register with the margins of the light opening in the aperture plate of the apparatus; and in order to prevent unnecessary strain on the film due to the intermittent movement thereof, the mechanism is provided with two continuously running sprocket drums the purpose of which is to furnish a loop or film to be drawn upon by the intermittent sprocket drum. As the upper and lower continuously moving sprocket drums in such prior mechanisms bear a fixed relation to the main frame, and the intermittent sprocket drum bears a shiftable relation to the main frame, it follows that the length of the film loops above and below changes with the shifting of the carriage upon which the intermittent sprocket drum is mounted. In practice it has been found that if the loops, especially the upper one, is too long, it has owing to the aforesaid intermittent movement, a tendency to excessive vibration which in turn influences the movement of the film on the apertured plate and prevents successive pictures from being accurately registered one with the other and causing what is known as unsteadiness of the pictures on the screen.

With a view to remedy the defects above stated the present improvement has for its object to provide a simple and efficient structural arrangement and combination of parts, in which the two continuously running feeding or loop forming sprocket drums have a vertically shiftable relation to the main frame, and in unison with the intermittent feeding sprocket drum, so as to insure a more uniform length of the loops in the film, and thus contribute to the steadiness of the pictures as projected on the screen, and at the same time retain the advantage of holding the kinetoscope shutter in fixed relation to the light aperture of the apparatus, all as will hereinafter more fully appear.

Figure 2:
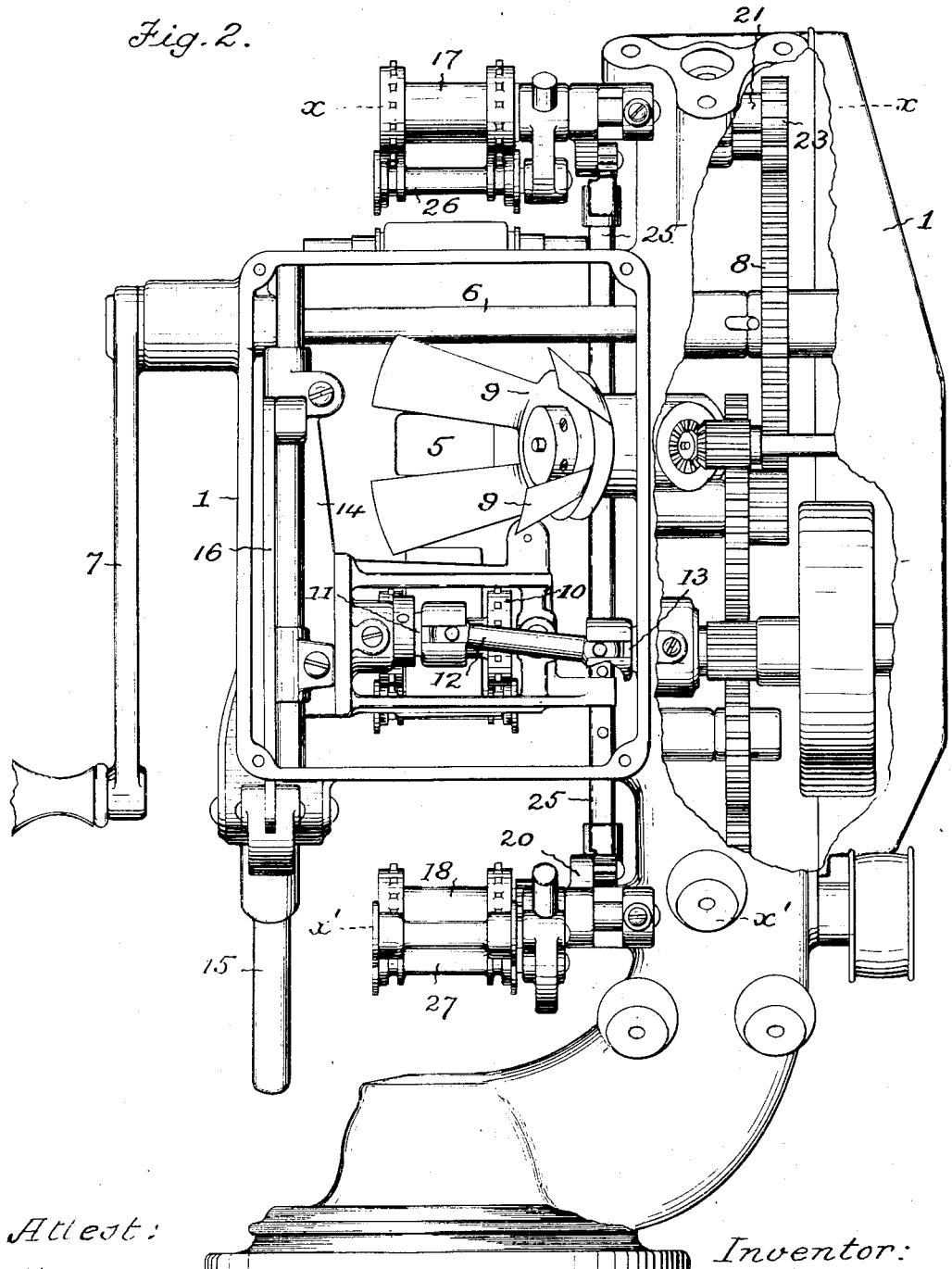
Figure 3:
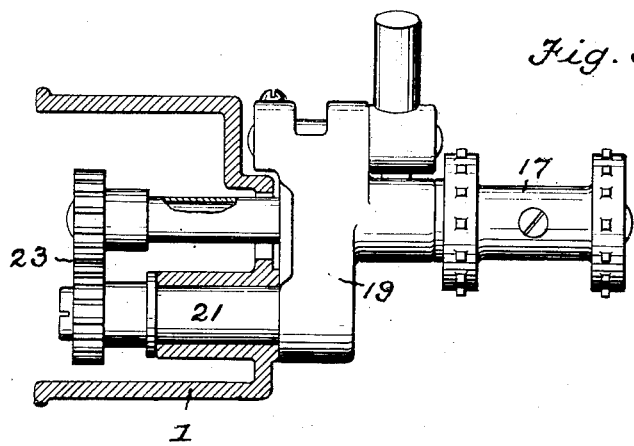
Figure 4:
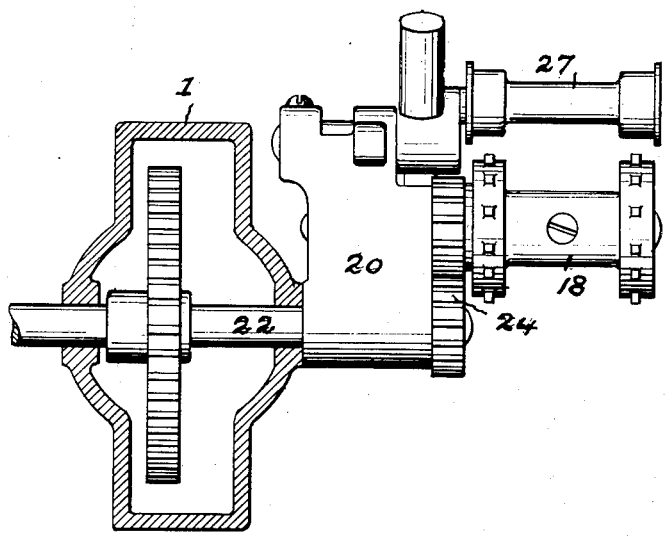

In the accompanying drawings: Figure 1, is a side elevation with parts of the main housing broken away. Fig. 2, is a front elevation with the front closure plate removed and with parts of said housing broken away. Fig. 3, is a fragmentary horizontal sectional elevation on line $x$—$x$, Fig. 2. Fig. 4 is a similar view on line $x'$—$x'$ Fig. 2.

Similar numerals of reference indicate like parts in the several views.

The general construction of the kinetoscope will be the same as in my aforesaid application Serial Number 425,094, and comprises a construction as follows:—

1, represents the main supporting frame or housing provided at one end with the usual objective 2, and at the opposite end with a horizontally swinging door 3, for the convenient introduction and removal of the picture film; said door being formed with the light opening or passage 5 of the apparatus.

6, is the main driving shaft journaled transversely on the main frame or housing 1, and provided at one end with an operating handle 7, and at the other end with the primary gear wheel 8 of the train gears by which the different mechanisms of the kinetoscope are driven.

9, is the revoluble light controlling shutter, preferably of the cone type described in detail in my prior application for Letters Patent Serial Number 413,346 filed January 30, 1908. Said shutter has its pivot axis in fixed relation to the aforesaid light opening 5, and receives continuous rotation by gearing connection with the main operating shaft 6 of the apparatus, as set forth in detail in the aforesaid application Serial Number 413,346.

10, is the intermittent film feeding sprocket drum, which as in my former application Serial No. 425,094 is arranged in adjacent relation to the light opening 5 aforesaid, and capable of adjustment in a vertical plane to and from said light opening for the purpose hereinbefore stated. Said sprocket drum is mounted on the hereinafter described carriage and receives intermittent rotation by intermittent gear connections between said sprocket drum and a countershaft 11 also mounted on said carriage; said countershaft in turn receives constant rotation through a universal connection 12, a countershaft 13 journaled in the main housing and gearing connections between said shaft 13 and the main driving shaft, as set forth in detail in my aforesaid application Serial Number 425,094.

14, is the carriage or frame above referred to, and which is guided in a vertical plane by suitable slide rods or guideways in housing 1, manual adjustment of said carriage being attained by a hand lever 15, journaled in the housing, and an intermediate connecting link 16.

17, is the upper and 18 the lower loop forming sprocket drums, arranged respectively above and below the intermittent film feeding sprocket drum 10, and receiving constant rotation, by the hereinafter described gearing connections, from the main driving shaft 6. Such drums are adapted to form and maintain loops in the picture film in adjacent relation to the aforesaid intermittent film feeding sprocket drum 10, to insure an easy and steady feed of the picture film past the light opening of the kinetoscope as hereinbefore more fully set forth. In the present construction said sprocket drums 17 and 18, are mounted on adjustable carriers, and preferably on the free ends of radius arms or links 19 and 20, that have pivotal movement on intermediate shafts 21 and 22, journaled in the main housing and operatively connected by intermediate spur gears with the main driving shaft 6, of the apparatus. Said shafts 21 and 22 have gear connections 23 and 24 with the sprocket drums 17 and 18 to impart constant rotation thereto in the operation of the apparatus.

25, is a vertical member forming a part of the carriage 14 aforesaid, and pivotally connected at its upper and lower ends to the radius arms 19 and 20 aforesaid, and so that said arms and the sprocket drums 17 and 18 carried thereon, will have simultaneous movement with said carriage in the vertical adjustment of the same.

26 and 27 are the usual idler drums by which the picture film is held in engagement with the upper and lower loop forming drums 17 and 18 aforesaid, during the operation of the machine, and which are capable of being swung out of the way when it is desired to remove the picture film, and to insert a fresh picture film.

Having thus fully described my said invention what I claim as new and desire to secure by Letters Patent, is:—

1. In a kinetoscope, the combination of a shutter journaled on an axis having a fixed relation to the light opening of the kinetoscope, a carriage movable in relation to said light opening, an intermittent film feeding mechanism mounted on said carriage, means for effecting an adjustment of said carriage, an intermediate operative connection between the shutter mechanism and the intermittent film feeding mechanism, the same comprising in part a universal connection which permits of the adjustment of the carriage, an upper loop forming drum, a movable carrier therefor, means for imparting continuous rotation thereto, and a connection between said carrier and the carriage aforesaid by means of which simultaneous movement is imposed on both, substantially as set forth.

2. In a kinetoscope, the combination of a shutter journaled on an axis having a fixed relation to the light opening of the kinetoscope, a carriage movable in relation to said light opening, an intermittent film feeding mechanism mounted on said carriage, means for effecting an adjustment of said carriage, an intermediate operative connection between the shutter mechanism and the intermittent film feeding mechanism, the same comprising in part a universal connection which permits of the adjustment of the carriage, upper and lower loop forming drums, movable carriers therefor, means for imparting continuous rotation to said drums, and a connection between said carriers and the carriage aforesaid by means of which simultaneous movement is imposed on the carriers and carriage, substantially as set forth.

3. In a kinetoscope, the combination of a shutter journaled on an axis having a fixed relation to the light opening of the kinetoscope, a carriage movable in relation to said light opening, an intermittent film feeding mechanism mounted on said carriage, means for effecting an adjustment of said carriage, and intermediate operative connection between the shutter mechanism and the intermittent film feeding mechanism, the same comprising in part a universal connection which permits of the adjustment of the carriage, an upper loop forming drum, a radius arm carrying said drum, means for imparting continuous rotation to said drum, and a connection between said radius arm and the carriage aforesaid by means of which simultaneous movement is imposed on both, substantially as set forth.

4. In a kinetoscope, the combination of a shutter journaled on an axis having a fixed relation to the light opening of the kinetoscope, a carriage movable in relation to said light opening, an intermittent film feeding mechanism mounted on said carriage, means for effecting an adjustment of said carriage, an intermediate operative connection between the shutter mechanism and the intermittent film feeding mechanism, the same comprising in part a universal connection which permits of the adjustment of the carriage, upper and lower loop forming drums, radius arms carrying said drums, means for imparting continuous rotation to said drums, and a connection between said radius arms and the carriage aforesaid by means of which simultaneous movement is imposed on said arms and carriage, substantially as set forth.

Signed at Chicago, Illinois, this 5th day of November 1908.

ALVAH C. ROEBUCK.

Witnesses:
ROBERT BURNS,
HENRY MOE.